United States Patent
Gupta

(10) Patent No.: US 11,121,860 B2
(45) Date of Patent: Sep. 14, 2021

(54) MULTI-LAYERED BLOCKCHAIN FOR DIGITAL ASSETS

(71) Applicant: LendingClub Corporation, San Francisco, CA (US)

(72) Inventor: Gautam Gupta, Fremont, CA (US)

(73) Assignee: LendingClub Corporation, San Francisco, CA (US)

( * ) Notice: Subject to any disclaimer, the term of this patent is extended or adjusted under 35 U.S.C. 154(b) by 356 days.

(21) Appl. No.: 16/233,793

(22) Filed: Dec. 27, 2018

(65) Prior Publication Data

US 2020/0213090 A1   Jul. 2, 2020

(51) Int. Cl.
  *H04L 9/06*  (2006.01)
  *H04L 29/06*  (2006.01)

(52) U.S. Cl.
  CPC .......... *H04L 9/0643* (2013.01); *H04L 63/102* (2013.01)

(58) Field of Classification Search
  CPC ... H04L 9/3236; H04L 9/3239; H04L 9/3247; H04L 63/102; H04L 63/12; G06F 16/1805; G06F 16/182; G06F 16/27; G06F 16/2379
  See application file for complete search history.

(56) References Cited

U.S. PATENT DOCUMENTS

| | | | |
|---|---|---|---|
| 2018/0165476 A1* | 6/2018 | Carey | G06F 21/577 |
| 2019/0188711 A1* | 6/2019 | Wu | G06Q 20/065 |
| 2019/0318359 A1* | 10/2019 | Arora | G06Q 20/401 |
| 2019/0340267 A1* | 11/2019 | Vo | G06F 16/2365 |
| 2020/0134066 A1* | 4/2020 | Yegorin | H04L 9/3239 |
| 2020/0167773 A1* | 5/2020 | Cervenka | G06F 16/27 |

* cited by examiner

*Primary Examiner* — Jung W Kim
*Assistant Examiner* — Adrian Stoica
(74) *Attorney, Agent, or Firm* — Hickman Becker Bingham Ledesma LLP; Jeffrey R. Madrak

(57) ABSTRACT

An item is encrypted to create a unique hash-value for the item. From this hash-value, an item can be uniquely identified. The hash-value for the item is stored in a first blockchain. When the item is included in a transaction, a transaction entry is stored in a block of the first blockchain. When an item participates in a group of items, a group of items is formed. The group of items is encrypted to create a unique hash-value for the group of items. The hash-value for the group of items may be based on hash-values from the items included in the group of items. The hash-value for the group of items is stored in a second blockchain that is distinct from the first blockchain. When the group of items is included in a transaction, a transaction entry is stored in a block of a second blockchain.

18 Claims, 4 Drawing Sheets

MULTI-LAYERED BLOCKCHAIN FOR DIGITAL ASSETS

TECHNICAL FIELD

One technical field of the present disclosure relates to improved methods, systems, computer software, and/or computer hardware in the field of distributed transaction computer systems. More particularly, the technology herein relates to computer systems and processes that interface with a blockchain.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

Blockchain technology has been used in certain digital currency implementations. An example implementation and techniques are described in a 2008 article by Satoshi Nakamoto, titled "Bitcoin: A Peer-to-Peer Electronic Cash System" and other information about the structure, function and implementation of blockchain and distributed ledger software and computing systems is widely available in public sources.

FIG. 1 depicts an embodiment of a distributed ledger system, which comprises a plurality of distributed nodes 104, 106, 108, 110, 112 and may be implemented by a plurality of computing devices. Distributed ledger system 102 represents a computing environment for operating a decentralized framework that maintains a distributed data structure, which may be referred to herein as a secure distributed transaction ledger or a blockchain. This blockchain ledger may support various functions, such as distributing computational tasks from one or more systems to one or more other systems, or interfacing and sharing data with other blockchains, among other functions.

To maintain the blockchain among the various nodes 104, 106, 108, 110, 112 in the distributed ledger system, a set of procedures are followed. Generally, such a network would suffer from inherent uncertainty and distrust between the nodes when they transact because they are typically unaffiliated with each other, may be transacting across vast distances, may be transacting anonymously, and because there is no centralized control or management to monitor or to resolve disputes. However, because the blockchain is maintained by each distributed node in the distributed ledger system and because it is maintained according to set procedures that employ cryptographic methods and a proof-of-work concept, the uncertain and distrust elements are mitigated.

Thus, in some embodiments, the secure distributed transaction ledger, or blockchain, is a ledger maintained collectively by the nodes in distributed ledger system 102. The blockchain includes blocks with digital data regarding recent transactions and/or messages, linking data that links one block to its previous block in the blockchain, proof-of-work data that ensures that the state of the blockchain is valid, and is endorsed by the majority of the record keeping systems. Furthermore, in embodiments, all confirmed transactions are included in the blockchain and are done so using cryptography. This way, the integrity and the chronological order of the blockchain are enforced and can be independently verified by each node.

New transactions may be added to the blockchain using a distributed consensus system that confirms these pending transactions by including them in the blockchain through a process commonly referred to as "mining." Mining enforces a chronological order in the blockchain and helps create and maintain integrity of the system. For transactions to be confirmed during the mining process, the transactions must be packed in a block and linked to the prior block, all according to a set procedure involving cryptography such as cryptographic checksums.

Digital data may be received by one or more nodes in the distributed ledger system 102 for inclusion in the blockchain. This digital data is generally referred to as a "transaction' and is made available generally to the nodes in the distributed ledger system 102. One or more computing devices, such as a computer, mobile phone, tablet, or server may be configured to connect to the distributed ledger system to publish digital data to blocks of the blockchain.

Digital representations of assets can be created and stored in a block of a blockchain. The asset can represent virtually anything, from a digital document to a sailing boat. The digital representation of an asset can be any value, or set of values, that uniquely identifies the asset. Each time any operation is performed involving an asset that is identified in a block chain, the operation is recorded in a block of the blockchain as a "transaction entry". The operation may be, for example, a change in ownership of the asset.

Currently, blockchain technology supports storing multiple transaction entries in a single block of a blockchain. The transaction entries in a block may correspond to different assets. However, each such transaction entry is for a single asset.

For a given asset, the blocks of a blockchain may have transaction entries for (a) changes to attributes of the asset, transfers in ownership of the asset, etc. Individual assets may be tracked on a single blockchain thoughout the lifetime of the asset, thereby enabling the history of the asset to be immutably stored, monitored, and verified by any interested entity.

The fact that each transaction entry must correspond to a single asset, difficulties arise when operation involves a bundled set of assets. For example, it is inefficient to record the sale of a bundle of assets as the individual sale of each of the assets in the bundle (resulting in the generation of N transaction entries, where N is the number of assets in the bundle).

To avoid this inefficiency, it is possible to treat the bundle itself as a single asset. By treating the bundle itself as a single asset, the same of the bundle may be reflected in a single transaction record. Because the group of assets is assigned a single asset identifier and treated as an individual asset, the group of assets can then be monitored throughout the lifetime of the group of assets as transactions related to the group are recorded in blocks of a blockchain.

Unfortunately, the treat-the-bundle-as-a-single-asset approach causes other problems. Specifically, because blockchains require groups of assets to be treated as individual assets, if an adjustment is made to attributes of an individual asset which is a member of a group of assets, it is difficult record this change in the blockchain. The blockchain is only aware of the bundle itself, not the individual assets contained therein. Thus, the blockchain does differentiate between the individual assets in the bundle, and those assets are assumed not to have individual histories that are separate from the history of the bundle itself.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

General Overview

Techniques are described herein for implementing a "multi-layer" blockchain. A multi-layer blockchain is comprises "layers" of blockchains. The blockchain at the lowest level is for transactions involving individual items. What the individual items are may vary from implementation to implementation, and the techniques described herein are not limited to any particular type of item.

Each subsequent layer of the blockchain is for bundles of items from the previous layer. For example, if the items in the finest-granularity layer are cars, then items in the next layer are bundles of cars. In yet the next layer, items correspond to bundles of bundles of cars.

By implementing layered blockchains, the history of a bundle of items may be recorded separately from the histories of the individual items. However, the history of the bundle may be "tied to" the history of the individual items by constructing the asset identifier of the bundle based on the asset identifier of the individual assets that belong to the bundle.

In an embodiment, an item (or the digital representation thereof) is cryptographically encrypted to create a unique hash-value for the item. From this hash-value, an item can be uniquely identified. The hash-value for the item is stored in a first blockchain. When the item is included in a transaction, a transaction entry is stored in a block of the first blockchain.

When an item is a member of a bundled group of items, an identifier for group of items is formed. The group of items is cryptographically encrypted to create a unique hash-value for the group of items. The hash-value for the group of items may be based on hash-values from the items included in the group of items. From this hash-value the group of items can be uniquely identified. The hash-value for the group of items is stored in a second blockchain that is distinct from the first blockchain. When the group of items is included in a transaction, a transaction entry is stored in a block of a second blockchain. By decrypting hash-values for groups of items, groups of items can be traced back to individual items stored in different blockchains. The mechanism of using multiple blockchains and multiple layers of hashing ensures that data in a group of digital items can not be tampered.

Multi-Layered Blockchain Overview

Figure 1:
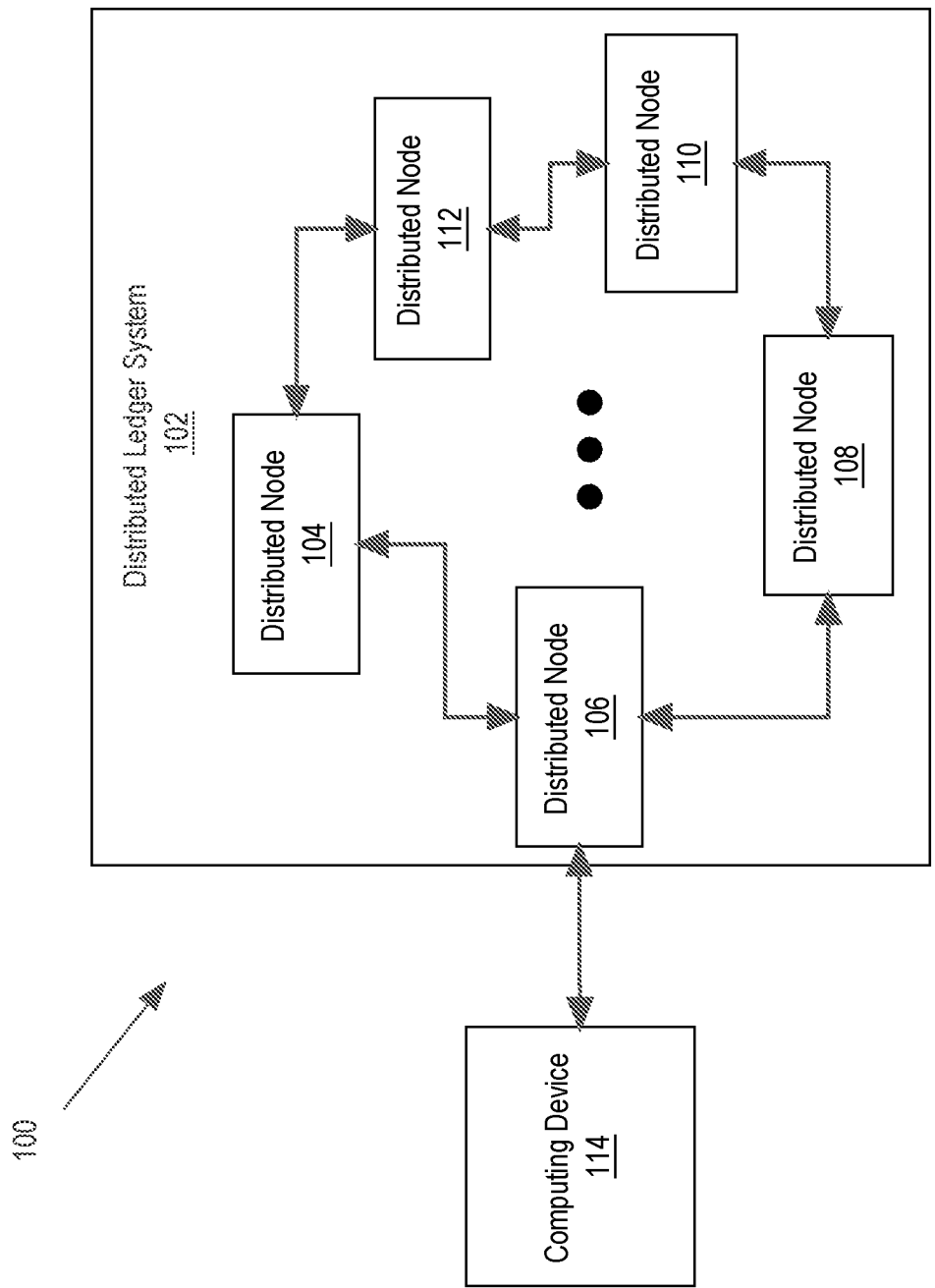
FIG. 1 depicts an embodiment of a distributed ledger system.
Figure 2:
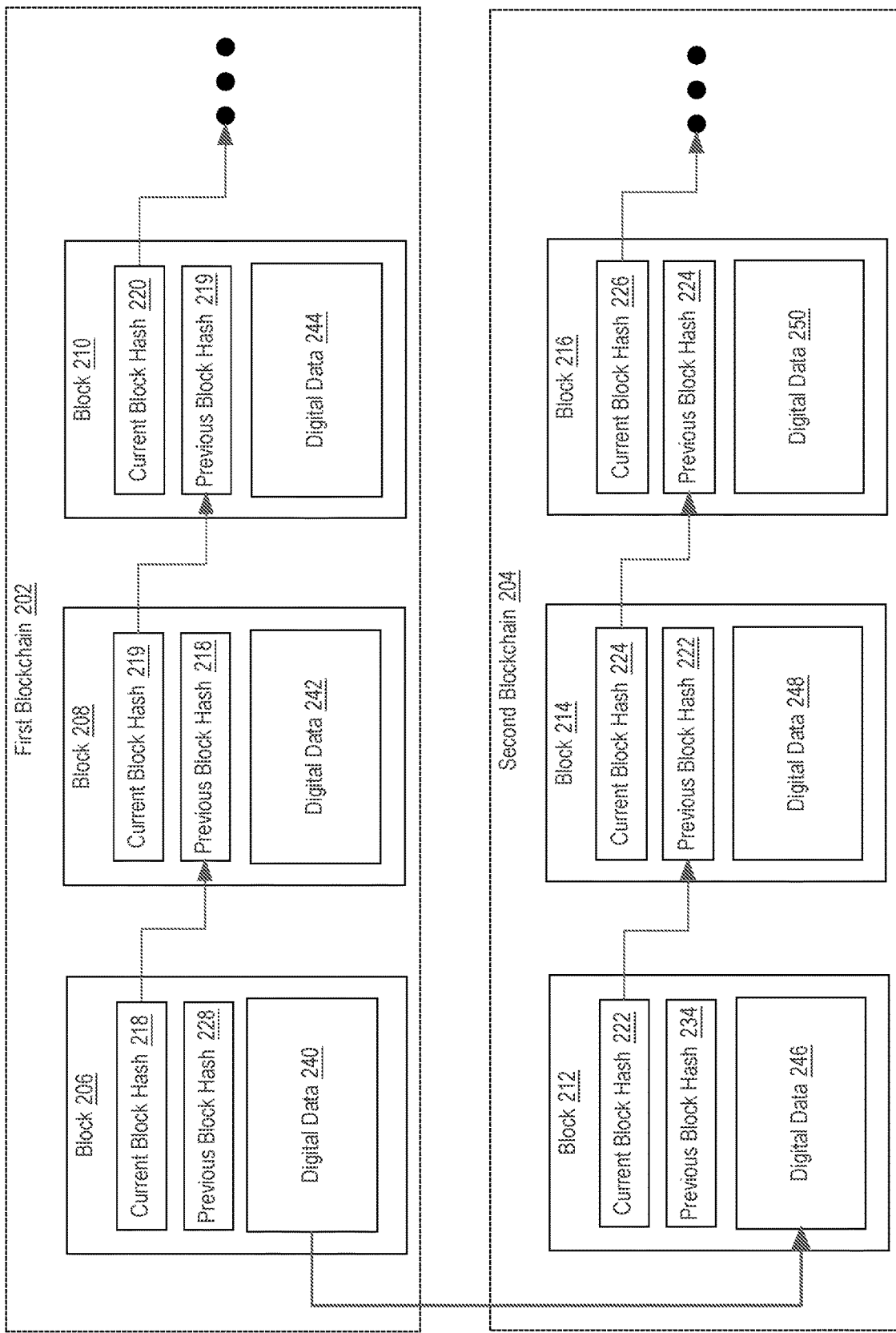
FIG. 2 depicts an embodiment of a multi-layered blockchain.

FIG. 2 depicts an embodiment of a multi-layered blockchain. For example, FIG. 2 shows a multi-layer blockchain comprising two different blockchains.

In an example embodiment, each blockchain 202, 204 comprises a blockchain having blocks. Each blockchain may include any number of blocks. In the example of FIG. 2, each blockchain has three blocks. First blockchain 202 includes blocks 206, 208, 210 and second blockchain 204 includes blocks 212, 214, 216. Each block may include its own index number, timestamp, digital data, hash, and hash of previous block, as discussed herein.

In an embodiment, the index number may be a numerical index that indicates a block's placement in the blockchain. The timestamp may be the date and time of when a block is created. The digital data may be digital data including transaction data, digital representations of items and/or assets. The hash may be a hash, such as an MD5 hash, SHA256 hash, or RIPEMD hash, of data stored in the block to uniquely identify a block of a blockchain. The previous hash may be the hash of a previous block, which links the blocks in sequence. A block may store a record of previous hash. These records of previous hashes link each new block to the previous block to form a chain that allows for integrity checks of each block.

As shown in FIG. 2, each block 206, 208, 210 from the first blockchain 202 stores a respective current block hash 218, 219, 220. Similarly, each block 212, 214, 216 of the second blockchain 204 stores a respective current block hash 222, 224, 226. Additionally, each block 206, 208, 210 from the first blockchain 202 stores a respective previous block hash 228, 218, 219 of a previous block. Similarly, each block 212, 214, 216 from the second blockchain 204 stores a respective previous block hash 234, 222, 224 of a previous block. A first block in a blockchain such as block 206 from first blockchain 202 and block 212 from second blockchain 204 may store a null value as a previous block hash because a previous block does not exist.

In various embodiments, digital data stored in each block may comprise digital representations of items. Digital representations of items may include item identifiers and attributes of items. Digital representations of items are not limited to any specific category or domain. For example, digital data stored in a block may include information that identifies an item such as a loan and attributes of the loan. The loan may be represented by an ID number or name and attributes of the loan may include an interest rate of the loan, number of installments of the loan, loan amount, disbursal date, etc. In another example, digital data stored in a block may include information that identifies an item such as a vehicle and attributes of a vehicle. The vehicle may be represented by a VIN number and other attributes of the vehicle may include a type of vehicle, type of engine, maintenance history of the vehicle, and other information about the vehicle.

As shown in FIG. 2, each block 206, 208, 210 from the first blockchain 202 stores respective digital data 240, 243, 244. Similarly, each block 212, 214, 216 of the second blockchain 204 stores respective digital data 246, 248, 250.

In an embodiment, an item-level hash value is generated for an item. The item-level hash value uniquely identifies the item. The item-level hash value may be generated based on one or more attributes of the item. An item-level hash value may be a hash, such as an MD5 hash, SHA256 hash, or RIPEMD hash. An item-level hash value is not to be confused with a hash of an entire block, as discussed above, which is used to links blocks of a chain of blocks in sequence. An item-level hash value may be stored in a block in place of digital representations of items and attributes of items that are used to generate the item-level hash value as part of digital data stored in the block. Alternatively, an item-level hash value may be stored alongside digital representations of items and attributes of items that are used to generate the item-level hash value as part of digital data stored in the block.

In various embodiments, the digital data stored in each block may comprise digital representations of groups of items. Digital representations of groups of items may include group identifiers and attributes of groups of items. Attributes of groups of items may include item-level hash values associated with each item in the group of items and other attributes such as the owners of the group. For example, digital data stored in a block may include information that identifies a group of loan items and attributes of the groups of loan items. The group of loan items may be represented by an ID number or name and attributes of the group of loan items may include identifiers of the owners of the group. In another example, digital data stored in a block may include information that identifies a group of vehicle items and attributes of the group of vehicle items. The group of vehicle items may be represented by an ID number for the group and attributes of the group may include the owners of the group.

In an embodiment, a group-level hash value is generated for a group of items. The group-level hash value uniquely identifies the group of items. The group-level hash value may be generated based on one or more of: item-level hash values associated with each item in the group of items, attributes of items associated with each item in the group of items, attributes of the group of items. A group-level hash value may be a hash, such as an MD5 hash, SHA256 hash, or RIPEMD hash. A group-level hash value is not to be confused with a hash of an entire block, as discussed above, which is used to links blocks of a chain of blocks in sequence. A group-level hash value may be stored in a block in place of digital representations of groups and attributes of groups that may be used to generate the group-level hash value as part of digital data stored in the block. Alternatively, a group-level hash value value may be stored alongside digital representations of groups and attributes of groups that may be used to generate the item-level hash value as part of digital data stored in the block.

In an embodiment, groups of items may be based on items stored in multiple distinct blockchains. For example, a first particular item is stored in a first particular block that belongs to a first particular blockchain. A second particular item is stored in a second particular block that belongs to a second particular blockchain. A particular group of the first particular item and second particular item is generated and stored on a third particular block of a third particular blockchain.

In an embodiment, groups may be based on multiple groups. The digital data stored in a block of a blockchain may comprise a digital representation of a group of groups and attributes of the group of groups. For example, a first particular group is stored in a first particular block that belongs to a first particular blockchain. A second particular group is stored in a second particular block that belongs to a second particular blockchain. A third particular group comprising the first particular group and second particular group is generated and stored on a third particular block of a third particular blockchain. Additionally, similar to how a group may be based on items stored in multiple distinct blockchains as discussed above, a group may be based on groups stored in multiple distinct blockchains. Furthermore, similar to how group-level hash values a group-level hash value can be generated for a group of items, group-level hash values can be generated for a particular group of groups and may be generated based on one or more of: group-level hash values of each group included in the larger group, attributes of each group used to form the particular group, attributes of items used to form the groups of the particular group.

In various embodiments, digital data stored in each block may comprise one or more transaction entries. A transaction entry may comprise information regarding a transaction, such as items, groups, or corresponding hash-values for items or groups included in the transaction, and transaction data. The transaction data may comprise information or data about the transaction such as the entities included in the transaction and general information about the transaction. For example, a transaction entry may include an identification of a loan item or an item-level hash of a loan item that was sold or transferred from a seller entity to a buyer entity. The transaction data included with the transaction entry may include information about the details of a transaction such as the price the loan was sold for and information about the buyer entity and seller entity involved in the transaction. In another example, a transaction entry may include an identification of a group of loans or a group-level hash of a group of loans that was sold or transferred from a seller entity to a buyer entity. The transaction data included with the transaction entry may include information about the details of the transaction such as the price the group of loans was sold for and information about the buyer entity and seller entity.

In various embodiments, digital data stored in each block may comprise a unique identifier of the sender of the data (or owner/originator/sender of the data). This information may be used for one or more purposes. For example, the identifier helps a device that reads the blockchain identify who published the data. The identifier of the publisher of the data also provides away by which a device can address a response to the sender, if desired. Additionally, the identifier of the owner/publisher may be used or linked to an account to pay for processing fees or other fees associated with using the blockchain as a communication channel, to perform computations, or other actions. Alternatively, a separate account identifier may be specified and used for payment purposes.

In an embodiment, a blockchain comprises a permissioned blockchain that is accessible by authorized entities. The blockchain may prevent the publishing or storing information and/or data to a block of the blockchain if the identification information is not authorized. In a permissioned blockchain, users must be enrolled in the blockchain before they can perform transactions or store digital chain to a block of the chain. The enrollment process gives users credentials that are used to identify the user when he or she performs transactions such as reading from the blockchain and publishing to the blockchain.

In an embodiment, each block of a blockchain comprises metadata indicating access control permissions for users of the blockchain. For example, access control permissions may determine whether a user is permitted to view or read information published to a particular block. Additionally, access control permissions included in the metadata of one block may determine whether a user is permitted to publish or store information to a next block.

In various embodiments, digital data may include instructions, such as configuration data, management data, and/or instruction-related data, for the device. In embodiments, this data may be a link to the configuration data, management data, and/or instruction-related data, or may be the data itself. In embodiments, the configuration data, management data, and/or instruction-related data may be a program, a container, or a link to data. In embodiments, a link to a program may comprise a unique identifier or an address to a program in the blockchain, may be a link to an application or container available outside the blockchain, or a combination thereof.

In various embodiments, digital data may include a way or ways for authenticating the data. For example, in some embodiments, the data may include a digitally signed message checksum as way to verify the data. For example, the publisher of the data may digitally sign a checksum or hash of the data using his or her private key. A receiving device can verify the integrity of the data by verifying the checksum or hash using the publisher's public key. Those having skill in the art shall recognize that other methods for verifying the data's integrity may also be employed herein.

Multi-Layered Blockchain Functionality

In various embodiments, a blockchain may be linked or associated with one or more other blockchains, referred to herein as a multi-layered blockchain. Each blockchain of a multi-layered blockchain may be associated with a unique distributed ledger system. First digital data from a first blockchain may be used to create second digital data in a second blockchain.

As discussed previously, group-level hash values stored in a particular blockchain may be generated based on two or more item-level hash values stored in blockchains other than the particular blockchain. A group-level hash value may be decrypted to identify the two or more item-level hash values that the group-level hash value is based on. The two or more item-level hash values may each then be decrypted to identify the attributes and associated information of each item that each item-level hash is based on.

Additionally, when an item or group of items is created in a block on a blockchain, a transaction entry that includes the item or group of items is stored in a block of the same blockchain. For example, in a multi-layered blockchain comprising a first blockchain storing items and a second blockchain storing groups of the items from the first blockchain, when a transaction occurs that affects an item that is stored in the first blockchain, the transaction is recorded in the first blockchain. When a transaction occurs that affects a group of items as a whole that is stored in the second blockchain, the transaction is stored in the second blockchain. A transaction that affects a group of items as a whole that is stored in the second blockchain has no impact on the first blockchain because the transaction relates to the group of items as a whole and not the individual items themselves.

Multi-Layered Blockchain Example

Figure 3:
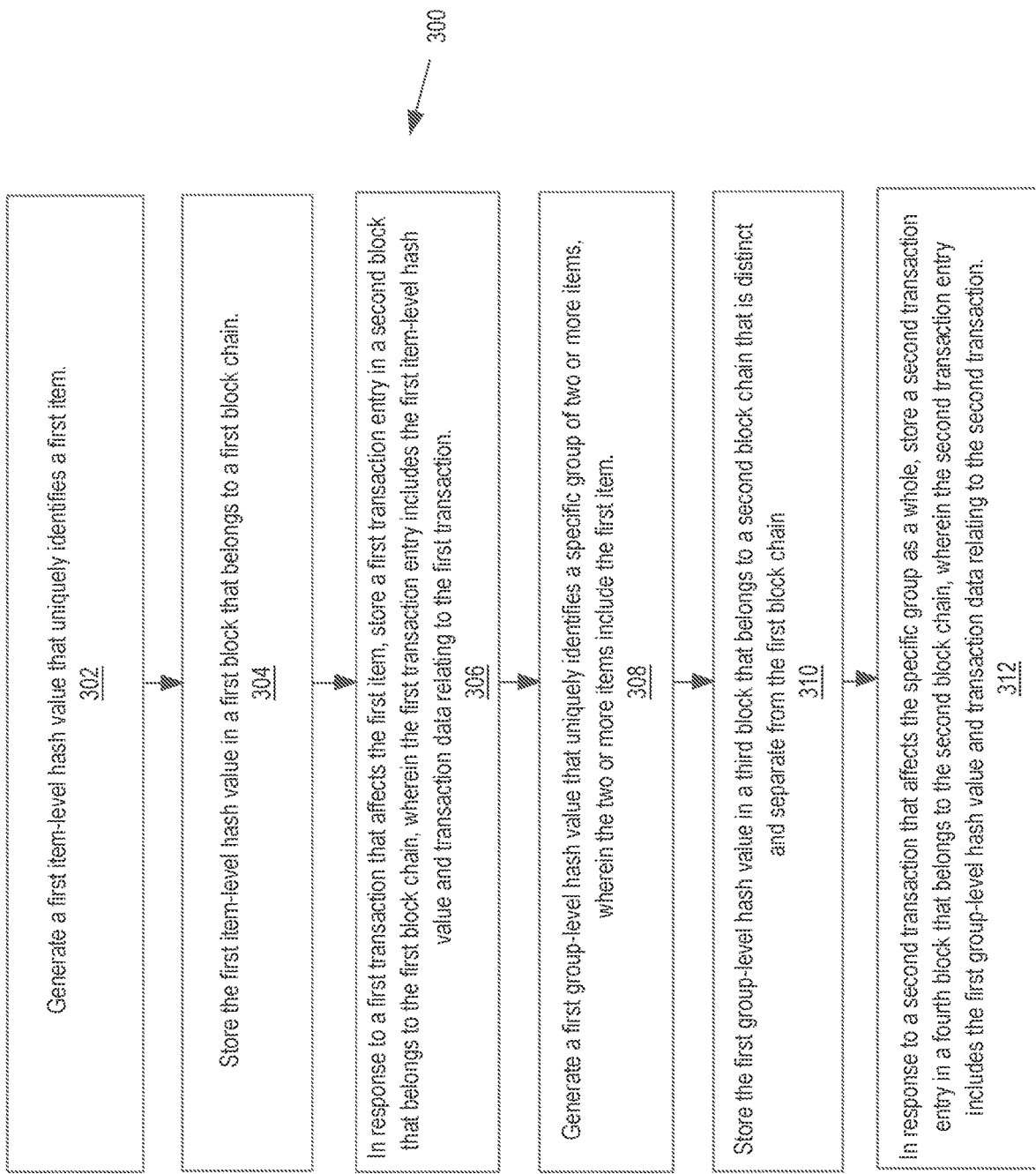
FIG. 3 depicts a method or algorithm for providing a multi-layered blockchain, in an example embodiment.

FIG. 3 depicts a method or algorithm for providing a multi-layered blockchain, in an example embodiment. FIG. 3 is described at the same level of detail that is ordinarily used, by persons of skill in the art to which this disclosure pertains, to communicate among themselves about algorithms, plans, or specifications for other programs in the same technical field. While the algorithm or method of FIG. 3 shows a plurality of steps providing authentication, authorization, and accounting in a managed system, the algorithm or method described herein may be performed using any combination of one or more steps of FIG. 3 in any order, unless otherwise specified.

For purposes of illustrating a clear example, FIG. 3 is described herein in the context of FIG. 2, but the broad principles of FIG. 3 can be applied to other systems having configurations other than as shown in FIG. 2. Further, FIG. 3 and each other flow diagram herein illustrates an algorithm or plan that may be used as a basis for programming one or more of the functional modules of FIG. 2 that relate to the functions that are illustrated in the diagram, using a programming development environment or programming language that is deemed suitable for the task. Thus, FIG. 2 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

At step 302, a first item-level hash value that uniquely identifies a first item is generated. For example, digital data that identifies a first item is received by one or more nodes in a distributed ledger system for inclusion in the first blockchain 202. The digital data that identifies the first item is hashed to generate a hash value that uniquely identifies the first item. The first item-level hash value may be based on one or more attributes associated with the first item.

At step 304, first item-level hash value is stored in a first block that belongs to a first blockchain. For example, the first item-level hash value that uniquely identifies the first item is stored as digital data in block 206 of the first blockchain 202. The first item-level hash value may be stored in the digital data 240 of block 206 in place of or alongside the digital representation of the first item and attributes of first item.

At step 306, in response to a first transaction that affects the first item, a first transaction entry is stored in a second block that belongs to the first blockchain. The first transaction entry includes the first item-level hash value and transaction data relating to the first transaction. For example, the first transaction entry may be stored in the digital data 242 of block 208 of the first blockchain 202.

At step 308, a first group-level hash value that uniquely identifies a specific group of two or more items is generated. The two or more items include the first item. For example, the first group-level hash value may be generated based on the item-level hash values of the two or more items that are stored in the first blockchain 202. Alternatively, the first group-level hash value may be generated based on one or more attributes associated with each item of the two or more items that are stored in the first blockchain 202.

At step 310, the first group-level hash value is stored in a third block that belongs to a second blockchain that is distinct and separate from the first blockchain. For example, the first group-level hash value is stored as digital data 248 in block 214 of the second blockchain. The first group-level hash value may be stored in the digital data 246 of block 212 of the second blockchain 204 in place of or alongside the digital representation of the specific group and attributes of the specific group.

At step 312, in response to a second transaction that affects the specific group as a whole, a second transaction entry is stored in a fourth block that belongs to the second blockchain. The second transaction entry includes the first group-level hash value and transaction data relating to the second transaction. For example, the second transaction entry may be stored in the digital data 248 of block 214 of the second blockchain 204.

Multi-Layered Blockchain Benefits

In certain example embodiments, a blockchain advantageously provides cryptographically safe storage and immutability for the records that are stored on the blockchain. The blockchain allows for a complete history of transactions (e.g., a chain of transactions). In certain example embodiments, cryptographic signing may be required or used to facilitate the request and performance of cloud service operations.

Since each block of a distributed blockchain contains a hash of the previous block before it, any unauthorized changes to data within the blockchain produces changes in the hash of each block in the chain. Therefore, unauthorized changes can easily be detected through the use of blockchains. Moreover, all changes to security service information are first approved by a consensus network of computers, which protects the integrity of the blockchain data.

The use of the blockchain allows for consensus confirmation (e.g., via mining) of submitted transaction before they may be considered "committed" to the cryptographic ledger that is represented by the blockchain. The records on the blockchain may then provide a shared view of data components included as part of tracking digital representations of items and groups of items throughout their lifecycle.

The isolation of multiple blockchains in a hierarchical structure provides enhanced security and data integrity. For example, instead of attempting to store items and groups of items in the same blockchain, items and groups of items are separated into two or more unique blockchains and linked together. Using the techniques discussed herein, each blockchain is isolated from the other in a separate distributed ledger system. Therefore, is one blockchain is compromised, the other blockchains maintain data integrity, providing layers of securitization. This separation provides enhanced security by reducing reliance on a single blockchain and effectively mitigates risk of data being compromised.

Furthermore, a multi-layered blockchain as discussed herein allows an entity to securely track of individual items, groups of items, and groups of groups of items while providing the functionality to trace a group back to individual items of the group and their associated attributes. By decrypting hash-values for groups of items, groups of items can be traced back to individual items stored in different blockchains. The mechanism of using multiple blockchains and multiple layers of hashing ensures that data in a group of digital items can not be tampered. Such an implementation may thus decrease the cost of replication across databases and provides absolute verifiability of logged transactions.

Furthermore, several layers of security are added by the implementations discussed herein. Not only may the blockchain be permissioned, in that only certain users with select credentials can read or write to the blockchain, and private, in that distributed ledger system is only shared between trusted entities and not made available to the public, but the implementation discussed herein provides further layers of security. For example, each block of the blockchain may specify access control limits, which control who can access each block and what data is written to the block they can access.

Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
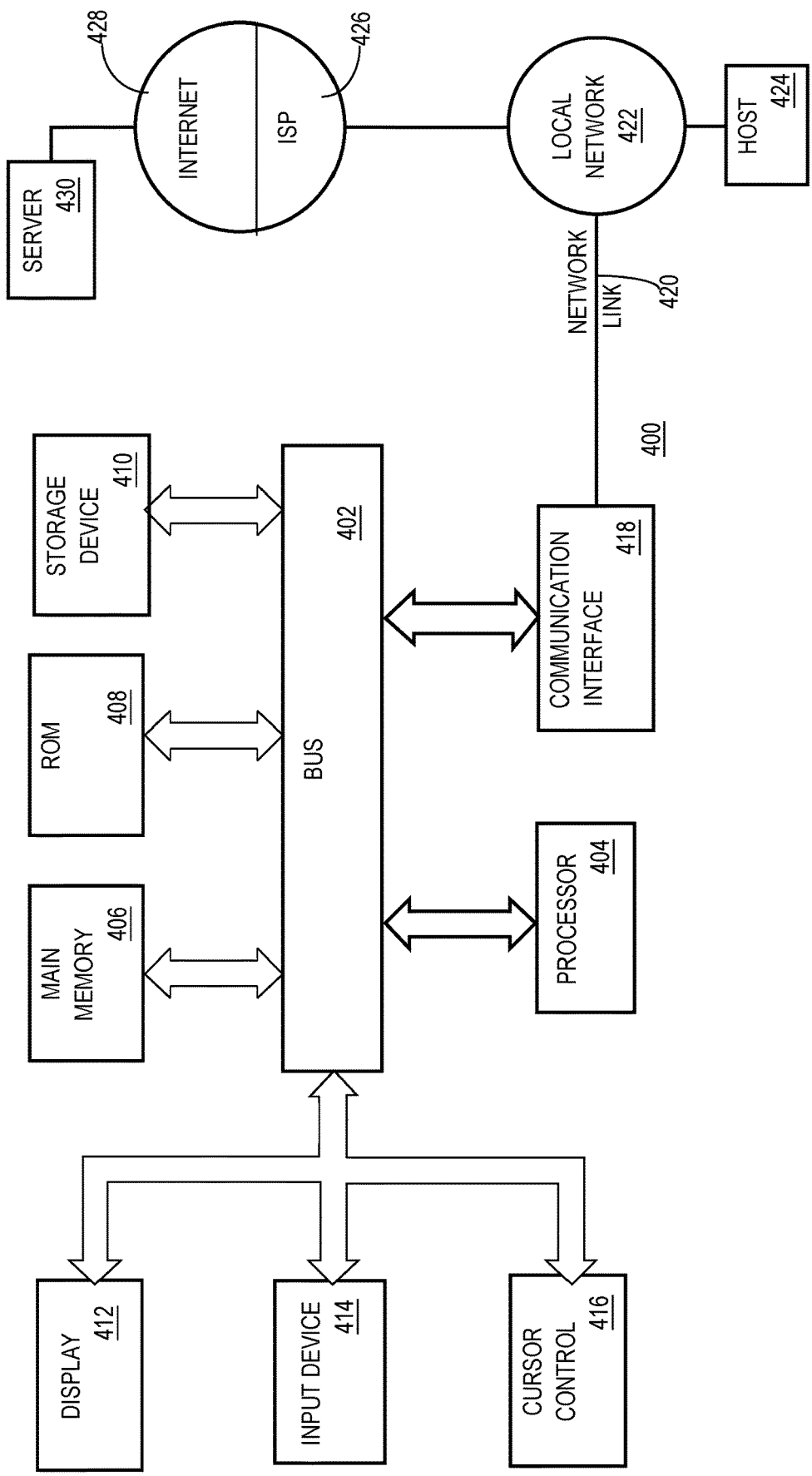
FIG. 4 depicts a computer system upon which an embodiment of the invention may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method comprising:
   storing, in a first blockchain, transaction entries for transactions performed on individual items;
   wherein storing transaction entries in the first blockchain includes:
      generating a first item-level hash value that uniquely identifies a first item;
      storing the first item-level hash value in a first block that belongs to the first blockchain;
      in response to a first transaction that affects the first item, storing a first transaction entry in a second block that belongs to the first blockchain;
      wherein the first transaction entry includes the first item-level hash value and transaction data relating to the first transaction;
   storing, in a second blockchain, transaction entries for transactions performed on specific groups of individual items;
   wherein storing transaction entries in the second blockchain includes:
      generating a first group-level hash value that uniquely identifies a specific group of two or more items;
      wherein the two or more items include the first item;
      storing the first group-level hash value in a third block that belongs to the second blockchain that is distinct and separate from the first blockchain;
      in response to a second transaction that affects the specific group as a whole, storing a second transaction entry in a fourth block that belongs to the second blockchain;
      wherein the second transaction entry includes the first group-level hash value and transaction data relating to the second transaction.

2. The method of claim 1, wherein the first item-level hash value is generated based on a set of attributes associated with the first item.

3. The method of claim 1, wherein the first group-level hash value is generated based on at least the first item-level hash value.

4. The method of claim 1, wherein each item of the two or more items of the specific group of two or more items is stored in the first blockchain.

5. The method of claim 1, wherein a first particular item of the two or more items of the specific group of two or more items is stored in the first blockchain and a second particular item of the two or more items of the specific group of two or more items is stored in a third blockchain.

6. The method of claim 1, wherein at least one of the first blockchain and second blockchain comprise a permissioned blockchain accessible by authorized entities.

7. The method of claim 1, further comprising:
   generating a second group-level hash value that uniquely identifies an aggregate group of two or more groups;
   wherein the two or more groups include the specific group;
   storing the second group-level hash value in a fifth block that belongs to a third blockchain that is distinct and separate from the first blockchain and second blockchain.

8. The method of claim 7, further comprising:
   in response to a third transaction that affects the aggregate group as a whole, storing a third transaction entry in a sixth block that belongs to the third blockchain;
   wherein the third transaction entry includes the second group-level hash value and transaction data relating to the third transaction.

9. The method of claim 7, wherein the two or more groups include a particular group stored in a fourth blockchain.

10. One or more non-transitory computer-readable media storing instructions which, when executed by one or more processors, cause:
    storing, in a first blockchain, transaction entries for transactions performed on individual items;
    wherein storing transaction entries in the first blockchain includes:
       generating a first item-level hash value that uniquely identifies a first item;
       storing the first item-level hash value in a first block that belongs to the first blockchain;
       in response to a first transaction that affects the first item, storing a first transaction entry in a second block that belongs to the first blockchain;
       wherein the first transaction entry includes the first item-level hash value and transaction data relating to the first transaction;
    storing, in a second blockchain, transaction entries for transactions performed on specific groups of individual items;
    wherein storing transaction entries in the second blockchain includes:
       generating a first group-level hash value that uniquely identifies a specific group of two or more items;
       wherein the two or more items include the first item;
       storing the first group-level hash value in a third block that belongs to the second blockchain that is distinct and separate from the first blockchain;
       in response to a second transaction that affects the specific group as a whole, storing a second transaction entry in a fourth block that belongs to the second blockchain;
       wherein the second transaction entry includes the first group-level hash value and transaction data relating to the second transaction.

11. The one or more non-transitory computer-readable media of claim 10, wherein the first item-level hash value is generated based on a set of attributes associated with the first item.

12. The one or more non-transitory computer-readable media of claim 10, wherein the first group-level hash value is generated based on at least the first item-level hash value.

13. The one or more non-transitory computer-readable media of claim 10, wherein each item of the two or more items of the specific group of two or more items is stored in the first blockchain.

14. The one or more non-transitory computer-readable media of claim 10, wherein a first particular item of the two or more items of the specific group of two or more items is stored in the first blockchain and a second particular item of the two or more items of the specific group of two or more items is stored in a third blockchain.

15. The one or more non-transitory computer-readable media of claim 10, wherein at least one of the first blockchain and second blockchain comprise a permissioned blockchain accessible by authorized entities.

16. The one or more non-transitory computer-readable media of claim 10, further comprising instructions for:
generating a second group-level hash value that uniquely identifies an aggregate group of two or more groups;
wherein the two or more groups include the specific group;
storing the second group-level hash value in a fifth block that belongs to a third blockchain that is distinct and separate from the first blockchain and second blockchain.

17. The one or more non-transitory computer-readable media of claim 16, further comprising instructions for:
in response to a third transaction that affects the aggregate group as a whole, storing a third transaction entry in a sixth block that belongs to the third blockchain;
wherein the third transaction entry includes the second group-level hash value and transaction data relating to the third transaction.

18. The one or more non-transitory computer-readable media of claim 16, wherein the two or more groups include a particular group stored in a fourth blockchain.

\* \* \* \* \*